May 11, 1937.  J. C. YOUNG  2,080,297

PISTON

Filed Aug. 8, 1936

Inventor
John C. Young,
By
Attorney

Patented May 11, 1937

2,080,297

UNITED STATES PATENT OFFICE 2,080,297

PISTON

John C. Young, Pittsburgh, Pa.

Application August 8, 1936, Serial No. 94,991

3 Claims. (Cl. 309—31)

My present invention relates generally to pistons for internal combustion engines as commonly equipped with expansible, elastic split rings, and my primary object is the provision of a piston having inelastic or substantially inelastic rings in segmental sections operating under normal spring pressure and augmented by a pressure, bearing a definite relation to the pressure within the combustion chamber, during the power stroke of the piston.

A further object in a general way is the provision of a piston construction employing rings which do not depend upon their inherent spring qualities as do the ordinary rings and in which the springs employed are for the purpose of merely positioning the inelastic or substantially inelastic ring segments against the cylinder wall.

More particularly, it is an object of my invention to defeat the pumping of oil by the piston rings, and to do this with a lesser number of rings than commonly employed, while at the same time eliminating the present danger of failure of proper contact of the rings with the cylinder wall due to loss of ring elasticity under the excessive heat to which they are subjected.

Figure 1:
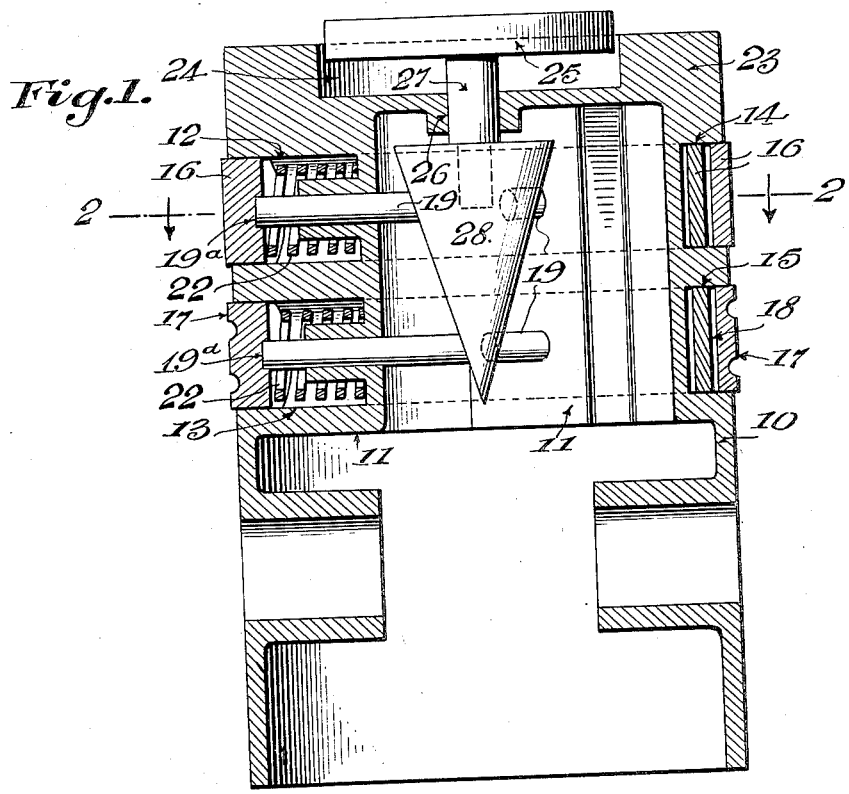
Figure 2:
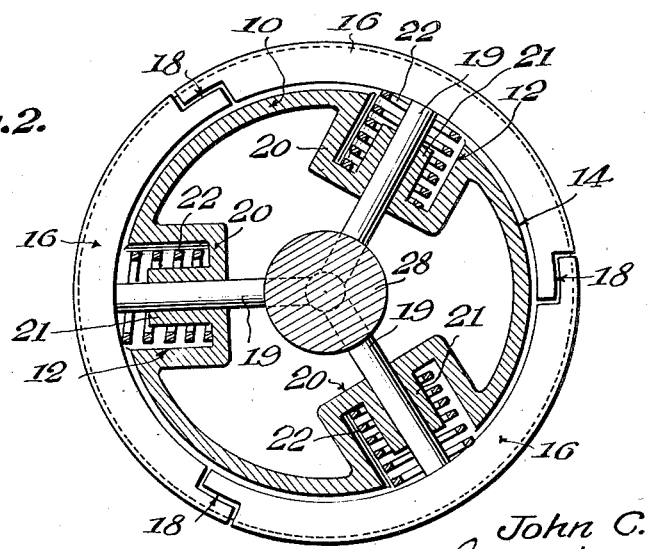

The invention is preferably carried out in a manner which will now be described in detail with reference to the accompanying drawing, forming a part of this specification, and in which, Figure 1 is a vertical sectional view through a piston constructed and equipped according to my invention, and Figure 2 is a horizontal sectional view taken therethrough substantially on line 2—2 of Figure 1.

Referring now to these figures, the invention contemplates a piston 10 for internal combustion engines whose cylindrical wall 10 is formed with equidistantly, circumferentially spaced inwardly projecting ribs 11 of like construction, each rib having upper and lower chambers 12 and 13 of cylindrical shape, each chamber opening at its outer end for its full diameter through the outer surface of the piston wall.

The outer surface of the piston wall 10 is formed with upper and lower grooves 14 and 15 of approximately the same width as the diameters of the chambers 12 and 13, the upper groove 14 being in the horizontal plane of the upper chambers 12 and the lower groove 15 being in the plane of the lower chambers 13. Moreover, these grooves 14 and 15, as well as the ring segments 16 and 17 which respectively interfit the same, are substantially wider in practice in a direction axially of the piston than the usual elastic expansible rings and their grooves, and in this, as in other ways, I provide for a much greater effective length of life of the ring structure than is ordinarily the case.

The ring segments 16 and 17 are not only wider but thicker than the usual expansible rings and have their adjacent ends lap jointed as seen at 18, each segment being centered opposite one of the chambers 12, 13 and provided at this point with an inwardly projecting guide rod or stem 19. Each chamber 12, 13 is closed at its inner end by a wall 20 which, in the proposed construction, is a part of the inner wall of the respective rib, and has a bearing sleeve 21 projecting therefrom axially into the respective chamber 12, 13 in spaced relation to the chamber wall. The opening of each sleeve is aligned with a bearing aperture through its respective wall 20, so that its respective ring segment rod or stem 19 may thus project inwardly beyond the respective rib 11 to the space within the piston wall 10 for a purpose which will presently appear.

The annular space between each bearing sleeve 21 and the wall of its chamber 12, 13 affords a guide channel for the reception of a coil spring 22 which, at its inner end, abuts the respective wall 20 and at its outer end engages the respective ring segment 16, 17 to hold the latter evenly and under a uniform normal pressure against a cylinder wall in use.

As seen in Figure 1, the top 23 of the piston has its outer upper surface provided with a coaxial, preferably cylindrical chamber 24 to receive a pressure-actuated plate 25 of conformable shape, and said piston top also has an opening 26 therethrough axially thereof and of the chamber 24. A pin 27 slidably interfits opening 26 and connects the pressure plate 25 with a cone-shaped ring expander 28 within the piston below its top 23, having portions of its cone surface above and below the ring grooves 14, 15 to receive thereagainst the conformably scarfed inner ends of the several rods or stems 19 of the ring segments 16, 17.

The parts are so proportioned that in use when the ring segments 16, 17 are in close contact with a cylinder wall under uniform normal tension of springs 22 the cone 28 is held by the inner ends of rods or stems 19 so that the pressure plate 25 is substantially above the base of its chamber 24. When, however, an explosion occurs above the piston, its pressure, directly acting against plate 25, forces the latter and consequently the cone 28 downwardly and in such downward movement the latter acts to expand, by pressure, the rings by reason of its direct pressure outwardly against the contacting inner ends of the rods or stems 19, thus augmenting the pressure contact of the ring segments 16, 17 against the cylinder wall in direct proportion to the pressure in the combustion chamber.

In this way, the only springs utilized, namely, springs 22, can be made of a type to promote uniform effect and are located so as to minimize adverse effect by the heat of combustion, and the pressure of the solid inelastic rings is regulated so as to have the highest efficiency during the power stroke of the piston when such efficiency is needed, the pressure tapering off between such power strokes to provide for effective lubrication without oil pumping or unnecessary loss thereof.

While the inwardly projecting stems or rods 19 have been spoken of previously as features with which the ring segments are provided, it is not to be understood by this that they (the stems) are necessarily integral parts of the ring segments. It is quite possible and well within the invention to make the stems or rods 19 as separate parts having their outer ends so engaging the ring segments as to prevent circumferential movements of the latter. For example, the outer ends of the rods or stems may extend into conformable recesses of the ring segments as shown at 19ᵃ in Figure 1.

What is claimed is:

1. A piston having in its top surface a chamber coaxial therewith and an axial opening through its top wall, a pressure plate for movement into said chamber by the force of an explosion, a cone-shaped expander within the piston, a pin connecting said plate and said expander and extending through said opening, the wall of the piston having ring grooves and circumferentially spaced radial chambers intersecting said grooves, rings in segmental sections having overlapping ends in the grooves, each ring section being centered opposite one of said chambers and having a central stem projecting inwardly through its chamber and into contact with said expander, and a spring housed in each chamber and engaging the respective ring section for placing the same under normal uniform tension.

2. A piston having an axially movable pressure actuated expander and having its wall provided with external annular grooves and internal radial ribs forming chambers opening outwardly through said grooves, a tubular guide member in each chamber, rings in said grooves in segmental sections, each section having a central stem projecting inwardly through one of said guide members and into contact with said expander, and a coil spring around each guide member and bearing outwardly against its respective ring segment.

3. A piston having ring grooves, inelastic rings in said grooves in segmental sections, each section having an inwardly radially projecting stem, a spring housed in the piston and engaging each ring section for applying normal tension thereto, and an axially-movable, pressure-actuated expanding member in the piston simultaneously engaging said stems for applying pressure-actuated expansive tension to the ring segments.

JOHN C. YOUNG.